Sept. 18, 1945.　　　H. G. SCHWARZ　　　2,385,033
REFRIGERATION UNIT FOR INTERNAL-COMBUSTION ENGINES
Filed Sept. 20, 1941　　5 Sheets-Sheet 1
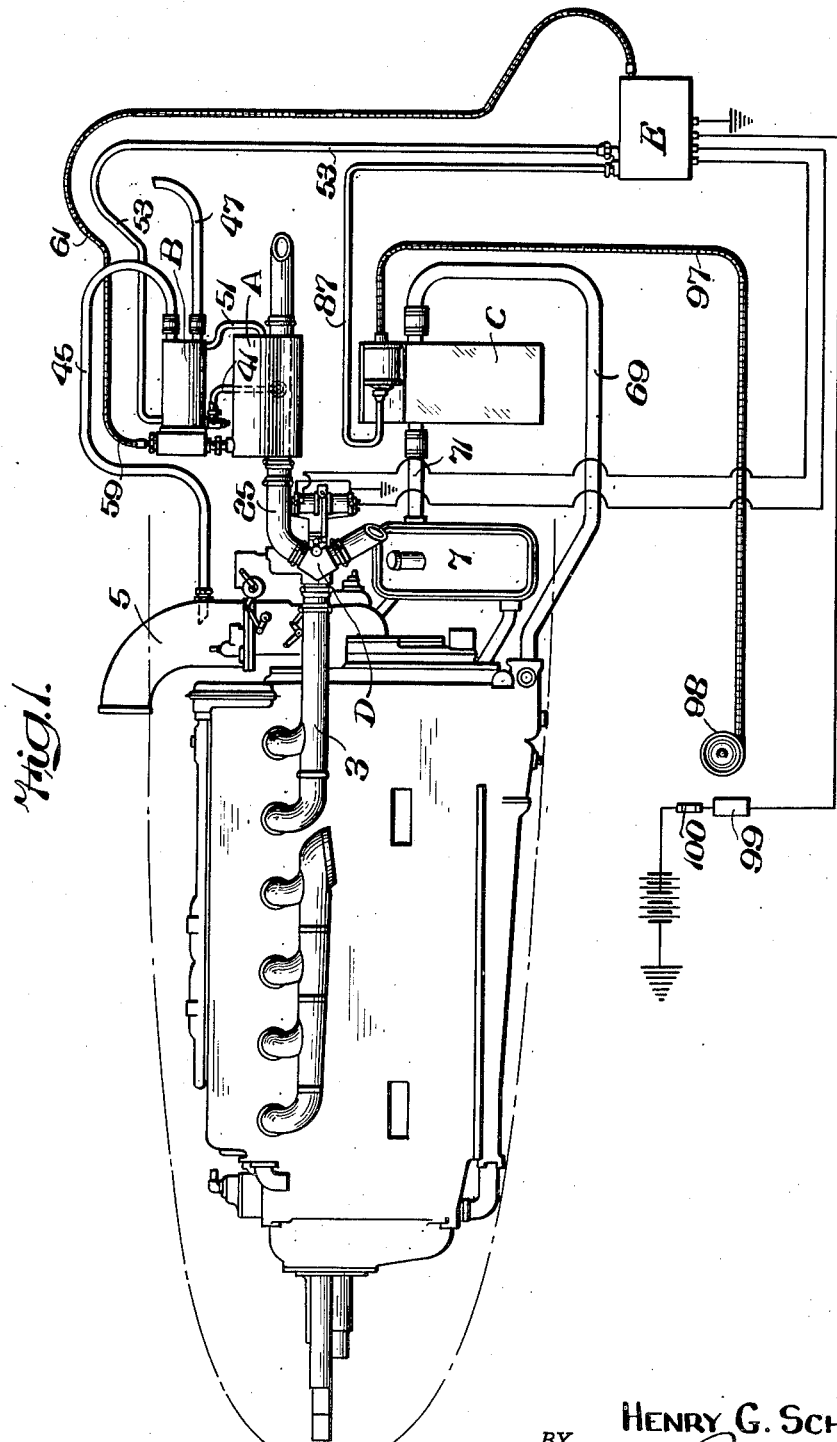
INVENTOR
HENRY G. SCHWARZ
BY
ATTORNEYS

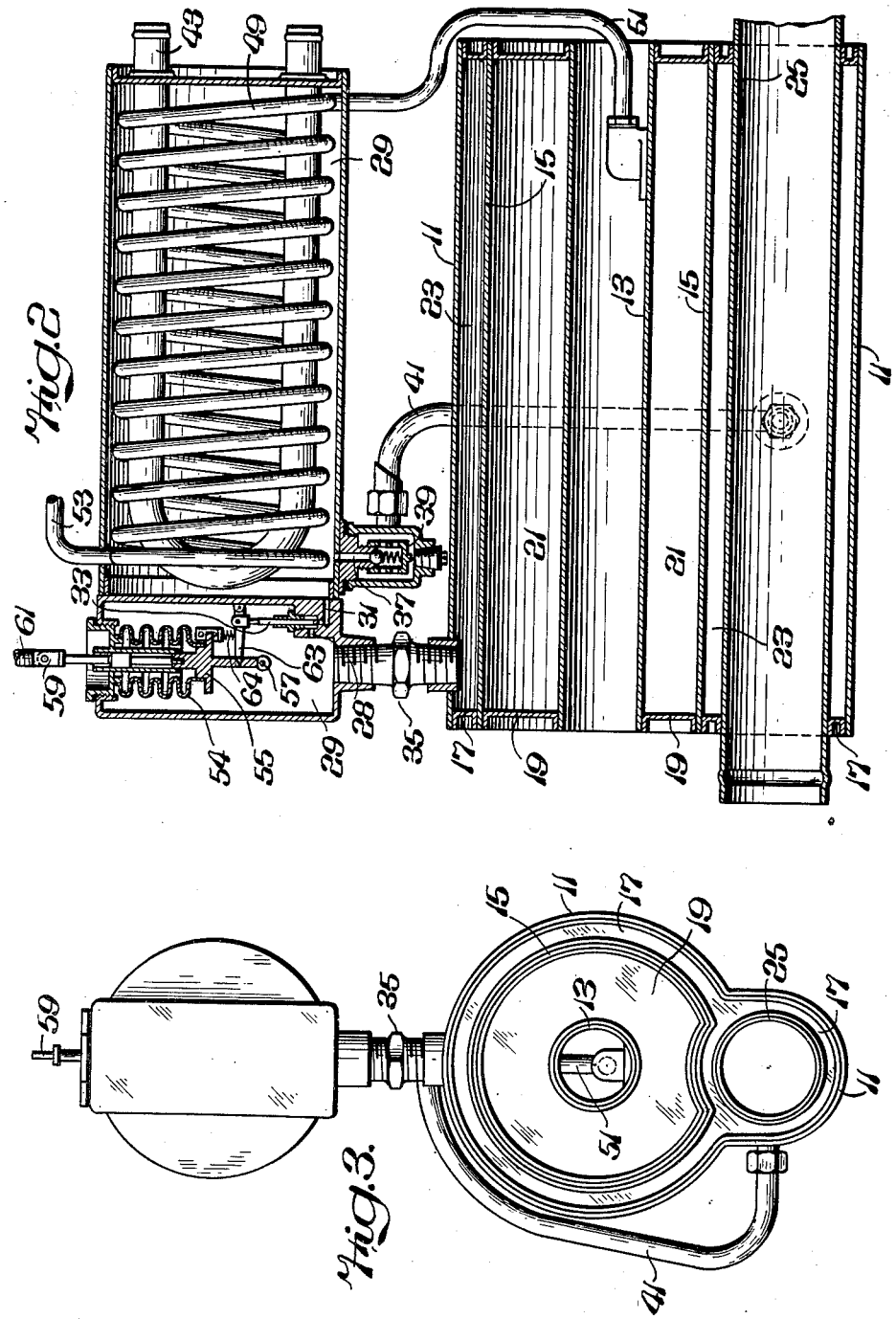

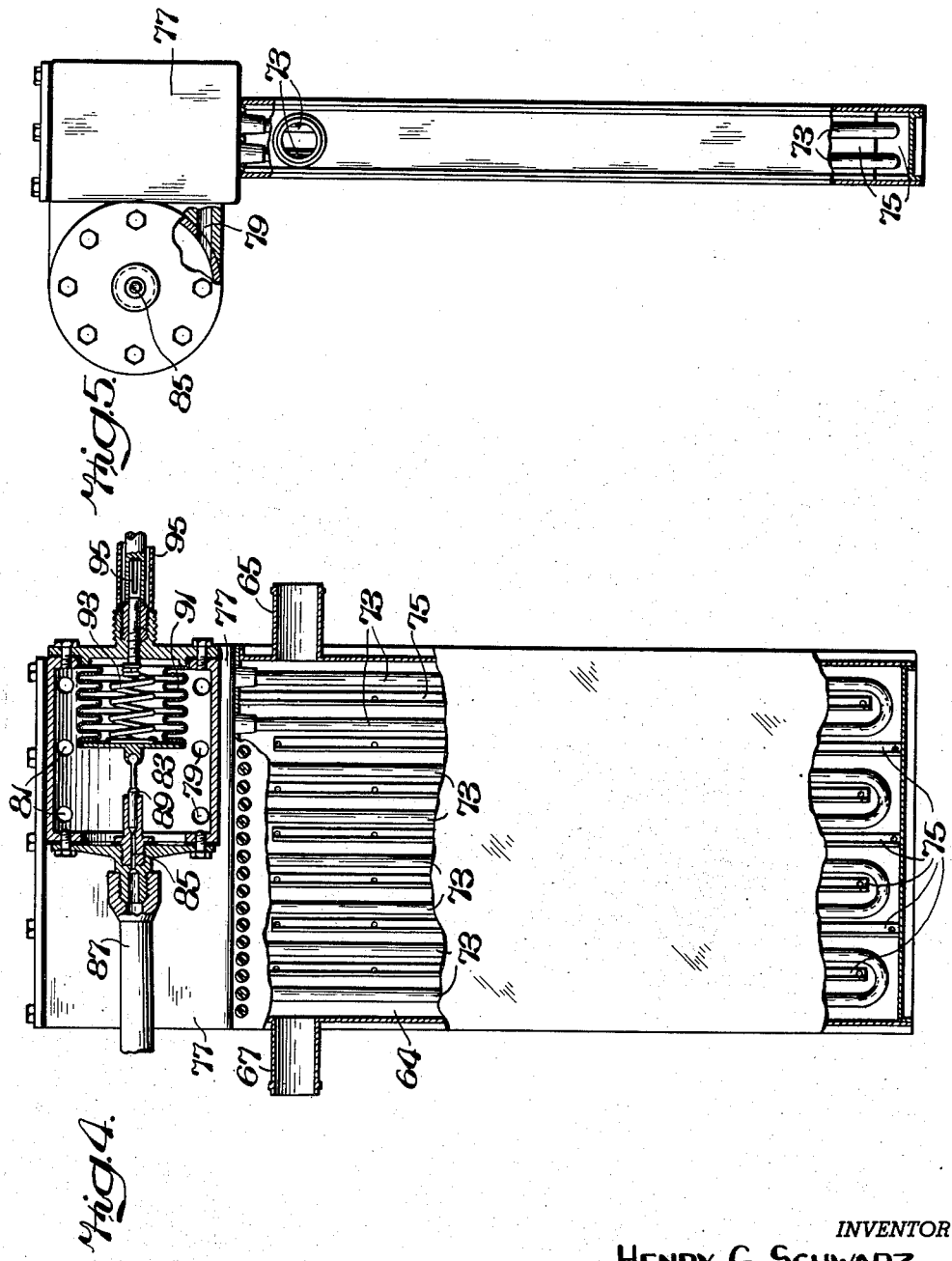

Sept. 18, 1945. H. G. SCHWARZ 2,385,033
REFRIGERATION UNIT FOR INTERNAL-COMBUSTION ENGINES
Filed Sept. 20, 1941 5 Sheets-Sheet 4
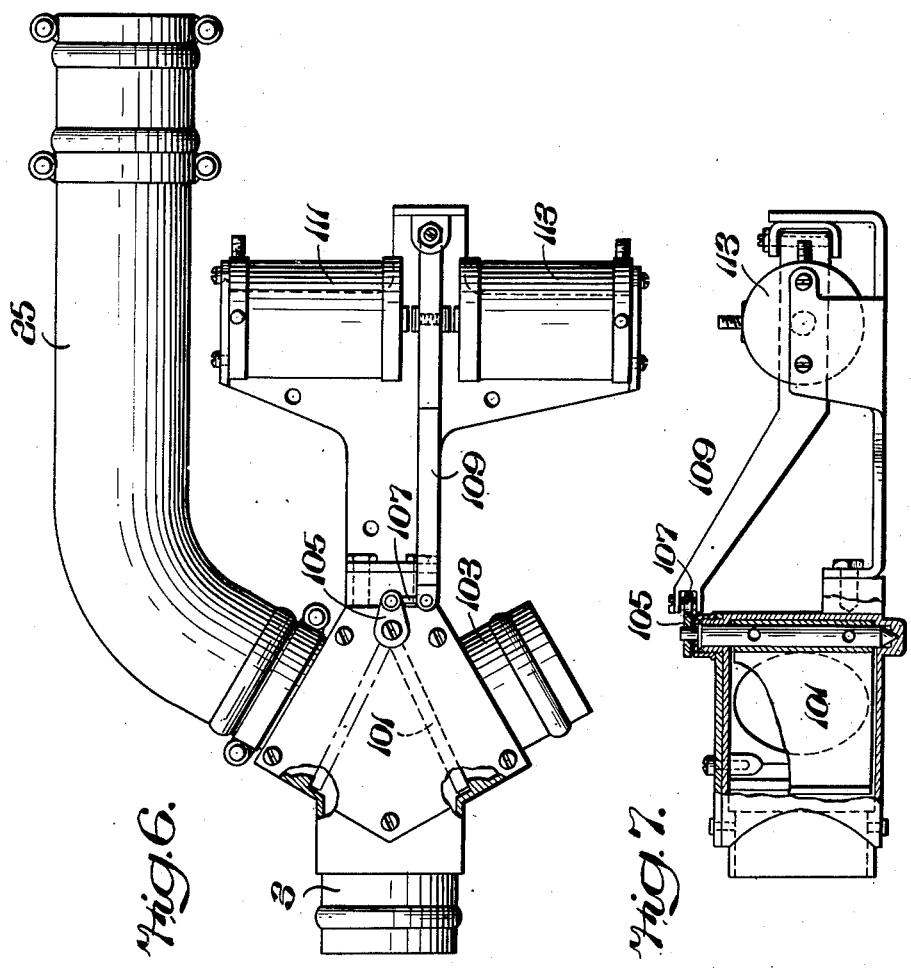
INVENTOR
HENRY G. SCHWARZ
BY
ATTORNEYS

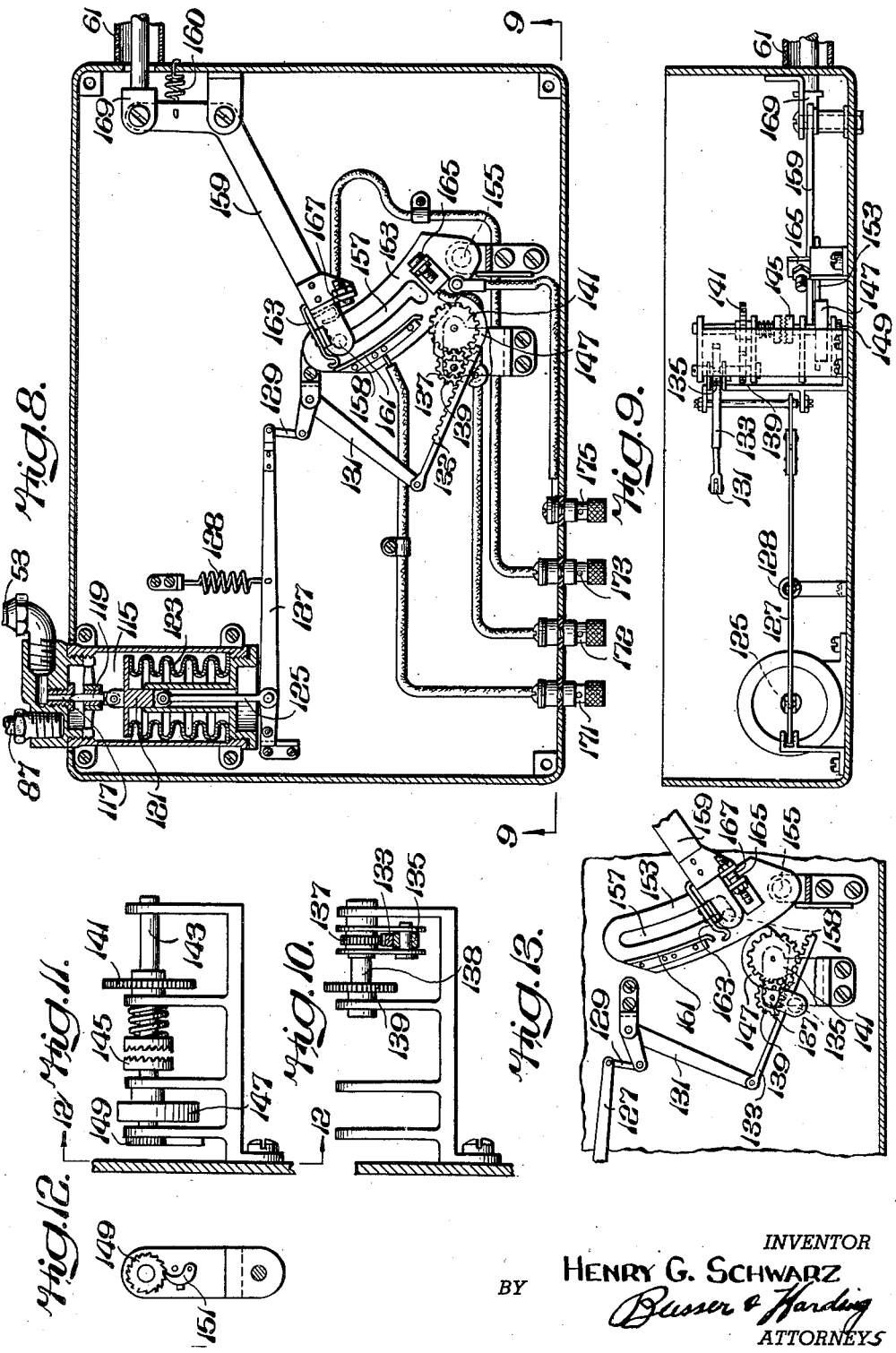

Patented Sept. 18, 1945

2,385,033

UNITED STATES PATENT OFFICE 2,385,033

REFRIGERATION UNIT FOR INTERNAL-COMBUSTION ENGINES

Henry G. Schwarz, Marshallton, Del.

Application September 20, 1941, Serial No. 411,629

2 Claims. (Cl. 123—174)

This invention relates to an improvement in refrigeration units for internal combustion engines, more particularly aircraft engines.

As is known, there is a need for positive, controlled cooling by refrigeration of high speed internal combustion engines, particularly aircraft engines. Such cooling means must be highly efficient, light in weight, and capable of close control. In my application Ser. No. 334,326, filed May 10, 1940, now Patent Number 2,261,418, I have disclosed a satisfactory refrigeration unit for internal combustion engines of an aircraft, specifically comprising an oil cooler. This unit includes a compressor driven from the aircraft engine, and hence its operation places a small but appreciable load upon the aircraft engine. The inclusion of moving parts in this refrigeration unit moreover necessitates inspection and maintenance, and increases the hazards of mechanical failure.

Now in accordance with the present invention I provide a highly efficient and closely controllable refrigeration unit for use with internal combustion engines, more particularly aircraft engines, which contains no moving parts (aside from the control mechanism thereof) and which is operated by the heat energy of the waste exhaust gases of the engine. The refrigeration unit in accordance with my invention may be variously used in association with the internal combustion engine on which it is installed, thus it may be used to cool the cooling liquid circulated through the jacket of a liquid cooled engine; to cool the engine oil to prevent undue decomposition thereof; or even to cool directly certain portions of the engine, although this last procedure is not ordinarily practicable in engines designed to operate at high temperatures.

The refrigeration unit in accordance with this invention will ordinarily comprise an absorber-generator unit in which the dry refrigerant, as ammonia, sulfur dioxide, etc., may be stored and from which it may be driven off; a condenser, preferably air-cooled; a refrigerating or heat transfer unit proper, in which the liquid to be cooled may be circulated in heat transfer relationship with the refrigerant; means for supplying hot exhaust gases of the engine to the absorber-generator unit when required, to drive off the refrigerant therefrom; and automatic control mechanism responsive to conditions within the refrigerant system, as the pressure of the refrigerant, for controlling the supply of exhaust gases to the absorber-generator unit.

Further details of my invention will be apparent from the following description of a preferred embodiment thereof, comprising an oil cooler for aircraft engines, read in conjunction with the accompanying drawings, in which:

Fig. 1 is a plan view, partly diagrammatic, showing the installation of an oil cooler in accordance with my invention in an internal combustion engine of an aircraft.

Fig. 2 is a vertical section through the absorber-generator unit and condenser of the oil cooler.

Fig. 3 is an end view of the absorber-generator unit and condenser shown in Fig. 2.

Fig. 4 is a side view, partly in section, of the refrigerating unit of the oil cooler.

Fig. 5 is an end view, partly in section, of the refrigerating unit of Fig. 4.

Fig. 6 is a detail plan view, partly in section, of the automatic valve controlling the passage of exhaust gases, and its operating mechanism.

Fig. 7 is a horizontal section through the valve mechanism shown in Fig. 6.

Fig. 8 is a vertical section through the control mechanism for the automatic valve.

Fig. 9 is a section on the line 9—9 of Fig. 8.

Fig. 10 is a detail view showing a part of the gear train shown in Fig. 8.

Fig. 11 is another detail view showing a further part of the gear train shown in Fig. 8.

Fig. 12 is a section taken on the line 12—12 of Fig. 11.

Fig. 13 is a detail view of the mechanism shown in Fig. 8, showing the parts in a different position.

The improved oil cooler in accordance with my invention comprises, as shown in Fig. 1, an absorber-generator unit A, a condenser B, a refrigerating unit C, an automatic valve D for controlling the exhaust gases, and a control mechanism E for the said valve. The general interrelationship and the connections among these several elements are shown in Fig. 1. For clarity, the several elements may be individually described as follows:

*The absorber-generator unit*

The absorber-generator unit, designated in Fig. 1 as A, and shown in detail in Figs. 2 and 3, is formed with an outer wall 11, an inner wall 13, and an intermediate wall, or partition, 15, which, with the end members 17, 19 respectively, form two generally annular chambers 21 and 23. The inner of these chambers 21 is filled with an adsorbent for ammonia gas. Preferably the adsorbent will be a solid adsorbent, such as silver nitrate, silica gel, silver chloride, etc. The outer chamber 23 is designed to contain a low boiling stable liquid, such as, for example, CFCl₃. Through the lower part of the outer chamber 23, which is enlarged to receive it, there passes a conduit 25 communicating, through the automatic valve D, with the exhaust manifold 3 of the internal combustion engine 1.

The condenser

The condenser, designated as B in Fig. 1, and shown in detail in Figs. 2 and 3, comprises two chambers 27, 29, respectively, in communication with one another through passages 28 and 31, controlled by needle valve 33. The chamber 27 is connected with the upper part of chamber 23 of the absorber-generator unit by means of a fitting 35, while the chamber 29 is connected through passage 37, controlled by check valve 39, and conduit 41 with the lower part of chamber 23.

Secured within the chamber 29 is a U-shaped tube 43 through which the condensing medium, in this case cold air from the exterior of the aircraft, is passed. Tube 43 is connected at its upper end through conduit 45 with the carbureter air scoop 5 of the internal combustion engine 1, and at its lower end through conduit 47 with the exterior of the plane. At the point of connection of th conduit 45 with the carbureter air scoop 5, close to the intake manifold, a partial vacuum is maintained, and consequently air is continuously drawn through conduit 47 into the condenser tube 43 and thence through conduit 45 to the carbureter air scoop. A helical coil 49 surrounds the condenser tube 43 within the chamber 29 and is connected at one end through the conduit 51 with chamber 21 of the absorber generator unit, and at its other end through conduit 53 with the automatic control mechanism E.

Positioned within the chamber 27 is a bellows diaphragm 54 and a plunger 55. Plunger 55 carries, at its lower end, a transverse pin 57, which, upon being raised sufficiently, will lift lever 63 against the spring 64 and so lift needle valve 32 from its seat. At its upper end the plunger 55 is connected, at 59, to one end of the drive wire of a flexible cable 61 of conventional design which leads to the control mechanism E.

The refrigerating unit

The refrigerating unit, designated in Fig. 1 as C, and shown in detail in Figs. 4 and 5, is similar to that disclosed in my application Ser. No. 334,326, filed May 10, 1940. Hot engine oil from the internal combustion engine 1 is brought through conduit 69 to the inlet 65 of the heat transfer chamber 64, and after passing through said chamber leaves through outlet 67 and passes, by means of conduit 71, to the oil reservoir 7 of the engine.

The chamber 64 contains a plurality of U-shaped tubes 73 designed to contain liquid refrigerant, in this case ammonia, and vertical baffles 75. By means of the baffles the hot oil is forced to flow up and down around the tubes 73, and the heat carried by the oil is given up to the ammonia, which is thereby vaporized.

All the tubes 73 are open at their upper ends to chamber 77, which is in turn connected, through lateral ports 79, 81, with chamber 83. Ammonia enters and leaves chamber 83 through passage 85, communicating with conduit 87, and thence, through the control mechanism and conduit 53, with condenser B. Passage 85 is controlled by needle valve 89 connected with a bellows diaphragm 91. Needle valve 89 is urged to its seat by a spring 93 within the diaphragm 91, the tension on which spring may be adjusted by rotation of shaft 95, to which is connected one end of the drive wire of a flexible control shaft 97 leading to a manual control 98, which may be conveniently placed in the cockpit of the plane. The manual control 98 may be similar to that described in my application S. No. 334,326.

The automatic valve

The automatic valve for control of exhaust gases of the internal combustion engine, designated as D in Fig. 1, is shown in detail in Figs. 6 and 7. The exhaust manifold 3 from internal combustion engine 1 leads into a valve chamber in which there is positioned a flap valve 101, which in one position (that shown in the dotted lines) closes conduit 103 and directs the hot exhaust gases from conduit 3 upward through conduit 25 to the absorber-generator unit A, and thence to the atmosphere; while in its other position (that shown in the dot and dash lines) it closes communication between conduits 3 and 25 and directs the exhaust gases from conduit 3 through conduit 103 directly to the atmosphere.

Flap valve 101 is operated, through lever 105 and link 107, by lever 109, which forms an armature for a pair of opposed electromagnets 111 and 113.

The control mechanism

The automatic control mechanism controlling the operation of the valve D is designated as E in Fig. 1, and is shown in Figs. 8 to 13, inclusive. As shown in Fig. 8, the control mechanism includes a chamber 115 in communication, through conduit 87, with chamber 83 of the refrigerating unit C, and through passage 117 and conduit 53 with the condenser B. A needle valve 119 carried by plunger 121 of bellows diaphragm 123 controls passageway 117. The plunger 121 is connected at its lower end, by means of link 125, with lever 127. The lever 127 is in turn connected by means of link 129 and bell crank 131 with rack 133, which is supported upon the roller bearing 135, and meshes with pinion 137 on shaft 138. Shaft 138 drives, through pinions 139 and 141, which are in mesh, the cam shaft 143, which drives, through the ratchet clutch 145, cam 147. Reverse movement of cam 147 is prevented by means of ratchet 149 and pawl 151. The gearing is such that an operative stroke of rack 133 will result in one-half revolution of cam 147.

Riding upon the cam 147 is cam follower 153, which is pivotally secured in the control box at 155. Cam follower 153 carries an L-shaped slot 157, in which rides a roller 158 carried on the lower end of bell crank 159, the upper end of which is connected at 169 to the drive wire of flexible cable 61. Also secured to cam follower 153 is a contact rail 161 adapted, during a portion of the cycle to be described, to be in contact with spring contact member 163 carried by lever 159. A second contact member 165 is also mounted on cam follower 153, and is adapted, during a portion of the cycle to be described, to contact the member 167 carried upon lever 159. The several contact members are insulated from the parts upon which they are mounted and from one another, except that contacts 163 and 167 are interconnected. Suitable leads extend from binding post 171 to contact rail 161, from binding post 172 to contact member 165, and from binding post 173 to contact shoe 163 and contact member 167. Binding post 175 is grounded by being connected to the cam follower 153.

Binding post 171 is connected with electromagnet 111 of the valve mechanism D, while binding post 172 is connected with electromagnet 113, each of the other leads of the electromagnets being grounded. Binding post 173 is connected through a switch 99, which may be conveniently mounted in the cockpit, and a fuse 100, with one side of a 12-bolt battery or other suitable source of electricity, the other side of which is grounded.

*Operation*

Assume that the elements of the control mechanism have just assumed the position shown in Fig. 8, at which time the adsorbent material in the absorber-generator A will be fully charged with ammonia. If the switch 99 is turned on, current will then pass to binding post 173 through shoe 163 to rail 161 to binding post 171 to the electromagnet 111 to ground. Armature 109 will thereupon be lifted to its upper position, thrusting lever 105 upwardly and thereby moving valve 101 to its lower position, shown in the dotted lines in Fig. 6.

Hot exhaust gases from the exhaust manifold 3 of the engine will thus pass through conduit 25 to the absorber-generator A, and in passing through conduit 25 will give up their heat content to the low boiling liquid contained in chamber 23 surrounding conduit 25. This liquid will thereby be vaporized and pass through fitting 35 into chamber 27 of the condenser C. In so doing, it will heat uniformly chamber 21 containing the adsorbed ammonia, which will thereby be driven off from the adsorbent through conduit 51 and condenser coil 49 to conduit 53. The reduction in temperature occasioned by passing through condenser coil 49, will be sufficient, at the pressure prevailing in this, the high pressure side of the system, to liquefy the greater portion of the ammonia.

The ammonia passing through conduit 53 from the condenser will reach control mechanism E, and, exerting pressure through passage 117 upon the needle valve 119 on the high pressure side of the system, which valve only lightly held to its seat, will open this valve when the pressure has been raised to a predetermined point and pass into chamber 115 and thence through conduit 87 to passage 85 of the refrigerating unit. Passage 85 is controlled by needle valve 89, which is held against its seat by a pressure in part dependent upon the manually adjustable tension of spring 93. At a point dependent upon the pressure conditions within the chamber 83 and the tension upon the spring 93, needle valve 89 will open and ammonia will be permitted to expand from the conduit 87 into chamber 83. Liquid ammonia within the chamber 83 will pass through the lower ports 79 into the distributing chamber 77, and thence into the tubes 73 within the heat exchange chamber 64. A supply of liquid ammonia within the tubes 73 will thus be provided to cool the hot oil passing through the chamber 64.

As the pressure in the chamber 115 continues to rise due to the continued heating of the adsorbent material in the absorber, the bellows diaphragm 123 will tend to be compressed, and plunger 121 and lever 127 will thereby tend to be moved downwardly against the tension of spring 128. Any downward movement of lever 127 is communicated, through link 129 and bell crank 131, to the rack 133, and through that and gears 137, 139, 141 and clutch 145, to the cam 147. So long, however, as the roller 158 on bell crank 159 is in the upper portion of the L-shaped slot 157 in cam follower 153, the cam follower, which, in the position shown in Fig. 8, rests upon the low part of the cam, cannot be raised. Hence the cam 147 cannot rotate and lever 127 cannot be moved downwardly by the pressure exerted upon it through the bellows diaphragm 123.

However, at the same time that the pressure is rising within chamber 115 due to an increase of pressure in the ammonia system, pressure is likewise rising in chamber 27 of the condenser B due to the vaporization of the volatile fluid contained in chamber 23. This increase in pressure within the chamber 27 compresses the bellows diaphragm 54 and lifts the plunger 55, thereby exerting a thrust through the drive wire of the flexible cable 61 upon the upper end 169 of the bell crank 159. This thrust tends to rock the bell crank 159 about its pivot and to move the roller 158 downwardly within the slot 157. The result is that when both the pressure within the chamber 115 and the pressure within the chamber 27 has risen to predetermined values, the roller 158 will be brought to the bottom of the L-shaped slot 157, and the cam follower 153 will be raised by action of the cam as it is rotated one-half turn through movement of the lever 127, so that the roller 158 will enter the L of the slot.

It is to be emphasized that before this result can be effected, the pressure in both the chambers concerned, i. e., chambers 115 and 127, must have risen to the desired values.

When the cam follower 153 and the bell crank 159 have assumed the position just described, as shown in Fig. 13, contact between shoe 163 and rail 161 will be broken, and contact between members 165 and 167 will be closed. Current will then cease to flow through the electromagnet 111, and will flow, instead, through the electromagnet 113. The position of armature 109 and flap valve 101 will thereby be reversed, and the exhaust gases will be cut off from conduit 25 and caused to pass directly to the atmosphere through conduit 103.

The liquid ammonia contained in the tube 73 in the refrigerating unit C will now be largely vaporized by heat absorbed from the hot oil, and the ammonia vapor present in chamber 77 will be forced through ports 81 into the chamber 83, where, when a pressure corresponding to the tension on spring 93 is reached, it will compress the bellows diaphragm 91, open the needle valve 89, and escape through passage 85 and conduit 87 back to the chamber 115.

As soon as heat was shut off from the absorber-generator unit by movement of flap valve 101, the pressure within chamber 115 fell rapidly, and lever 127 was returned to its upper position by the action of spring 128. This upward movement of lever 127 resulted in a rearward movement of the rack 133, which motion, however, was not transmitted to the cam 147 because of the presence of the ratchet clutch 145 and the ratchet 149 and detent 151, closing valve 119 to shut off communication between the high and low pressure sides of the system. Accordingly, when the pressure again rises in chamber 115, as the ammonia flows back from the refrigerator unit through conduit 87, the plunger 121 is again forced downwardly, and with it the lever 127. In the manner already described, shaft 143 is thereby rotated, and with it the cam 147 is given another one-half rotation in a forward direction. This permits cam follower 153 to drop off the high part of the cam.

The roller 158 upon the end of the bell crank 159 is thereby freed from the L of the slot 157.

Prior to this, the transverse pin 57 carried upon the plunger 55 within the chamber 27 will have been lifted sufficiently far to raise the lever 63 against the tension of spring 64 and lift needle valve 33, thereby opening communication between chambers 27 and 29. The vapor contained in chamber 27 will accordingly pass to chamber 29, where it will be condensed by contact with condenser tube 43, and the condensed liquid will flow through passage 37 past the check valve 39, and through conduit 41 back into the now cool chamber 23.

The pressure exerted through the flexible cable 81 upon the bell crank 159 is released as soon as the valve 33 is opened, and the bell crank is thus free to return, under the influence of spring 160, to the position shown in Fig. 8.

Meanwhile, the ammonia gas has passed from chamber 115 through passageway 117 to conduit 53, and thence through condenser coil 49 and conduit 51 to the now cold adsorbent in chamber 21, in which it is absorbed. The release of pressure within the chamber 115 permits the lever 127, rack 133 and associated elements, to return to the position shown in Fig. 8, this return being accomplished, as previously explained, without any motion of the cam 147.

When cam follower 153 dropped and the bell crank 159 resumed its upper position, contact between members 165 and 167 was broken, and contact was again closed between the shoe 163 and rail 161. The position of the valve 101 was thus again reversed, and exhaust gases passed through conduit 25 to the absorber, thus beginning a new cycle.

It will thus be seen that the complete cycle comprises two parts in the first of which ammonia is driven from the absorber-generator by the application of heat thereto, and, after passing through the condenser, is permitted to expand through an expansion valve into the refrigerating unit; while in the second the ammonia gas leaving the refrigerating unit is allowed to pass to the now cold absorber-generator to be there adsorbed. The shift from one part of the cycle to the other is automatically effected in response to conditions within the system by the control mechanism already described.

Control of the amount of cooling and hence of the oil temperature may be effected by manual adjustment of control 96, rotation of which will, through the flexible cable 97, rotate shaft 95 to increase or decrease the tension on spring 93 which governs the action of the expansion valve 89.

While my invention has been described in detail as embodied in an oil cooler, it will be appreciated that it may be used on an internal combustion engine for other purposes, as cooling the cooling liquid therefor, without essential alteration; and that accordingly my invention is not limited to an oil cooler or to the particular constructional details of the preferred embodiment described above.

What I claim and desire to protect by Letters Patent is:

1. A refrigeration system for use in association with an internal combustion engine comprising, in combination, a heat interchanger adapted to receive a liquefied refrigerating medium, an absorber containing an adsorbent for the refrigerating medium, a condenser interposed between said heat interchanger and said absorber, the interchanger, condenser and absorber forming a closed system containing the refrigerating medium, means for supplying hot exhaust gases of the internal combustion engine to the absorber to heat the same, and means responsive to variations in the condition of the refrigerating medium within said system for controlling the supply of exhaust gases to said absorber, said condenser also including an air inlet and an air outlet, the latter connected to the carburetor air supply of said engine, whereby air is drawn through said condenser in heat exchange relationship with the refrigerating medium.

2. An oil cooler for an internal combustion engine comprising, in combination, a heat interchanger adapted to receive a liquefied refrigerating medium, means for circulating hot engine oil through said heat interchanger in heat exchange relationship with said liquefied refrigerating medium, an absorber containing an adsorbent for the refrigerating medium, a condenser interposed between said heat interchanger and said absorber, the interchanger, condenser and absorber forming a closed system containing the refrigerating medium, means for supplying hot exhaust gases of the internal combustion engine to the absorber to heat the same, and means responsive to variations in the condition of the refrigerating medium within said system for controlling the supply of exhaust gases to said absorber, said condenser also including an air inlet and an air outlet, the latter connected to the carbureter air supply of said engine, whereby air is drawn through said condenser in heat exchange relationship with the referigerating medium.

HENRY G. SCHWARZ.